United States Patent [19]

Weikel

[11] 4,278,359
[45] Jul. 14, 1981

[54] CONTROL CIRCUIT FOR USE WITH A DOT MATRIX PRINTER

[75] Inventor: David S. Weikel, Fort Wayne, Ind.

[73] Assignee: Weikel Associates, Inc., Fort Wayne, Ind.

[21] Appl. No.: 30,120

[22] Filed: Apr. 16, 1979

[51] Int. Cl.³ .............................................. B41J 19/32
[52] U.S. Cl. ........................................ 400/303; 400/3; 400/121
[58] Field of Search ......................................... 400/3–5, 400/121, 124, 303–306, 320, 322, 328

[56] References Cited

U.S. PATENT DOCUMENTS

| 4,050,563 | 9/1977 | Menhennett | 101/93.05 X |
| 4,169,684 | 10/1979 | Blom | 364/900 X |
| 4,213,714 | 7/1980 | Jones et al. | 400/124 |

Primary Examiner—Paul T. Sewell
Attorney, Agent, or Firm—Ronald D. Welch

[57] ABSTRACT

A control circuit for use in conjunction with dot matrix printers which includes a command word gate which is connected to a data source to receive data signals, the command word gate generating a control circuit enabling signal in response to reception of a predetermined coded command word signal from the data source. A density latch gate is connected to the data source to receive density code signals and to the command word gate and generates a density code output signal in response to reception of the command word signal and density code signals received from the data source. Connected to the density latch gate is a printer signal generating circuit with produces an output signal having a frequency proportional to the density code signal. This signal is applied to a dot matrix printer to vary the ratio of the lateral velocity of the printing head of a printer and the printing frequency of the printing hammers thereof to thereby selectively alter the horizontal dimension of alphanumeric characters produced by the printer.

10 Claims, 4 Drawing Figures

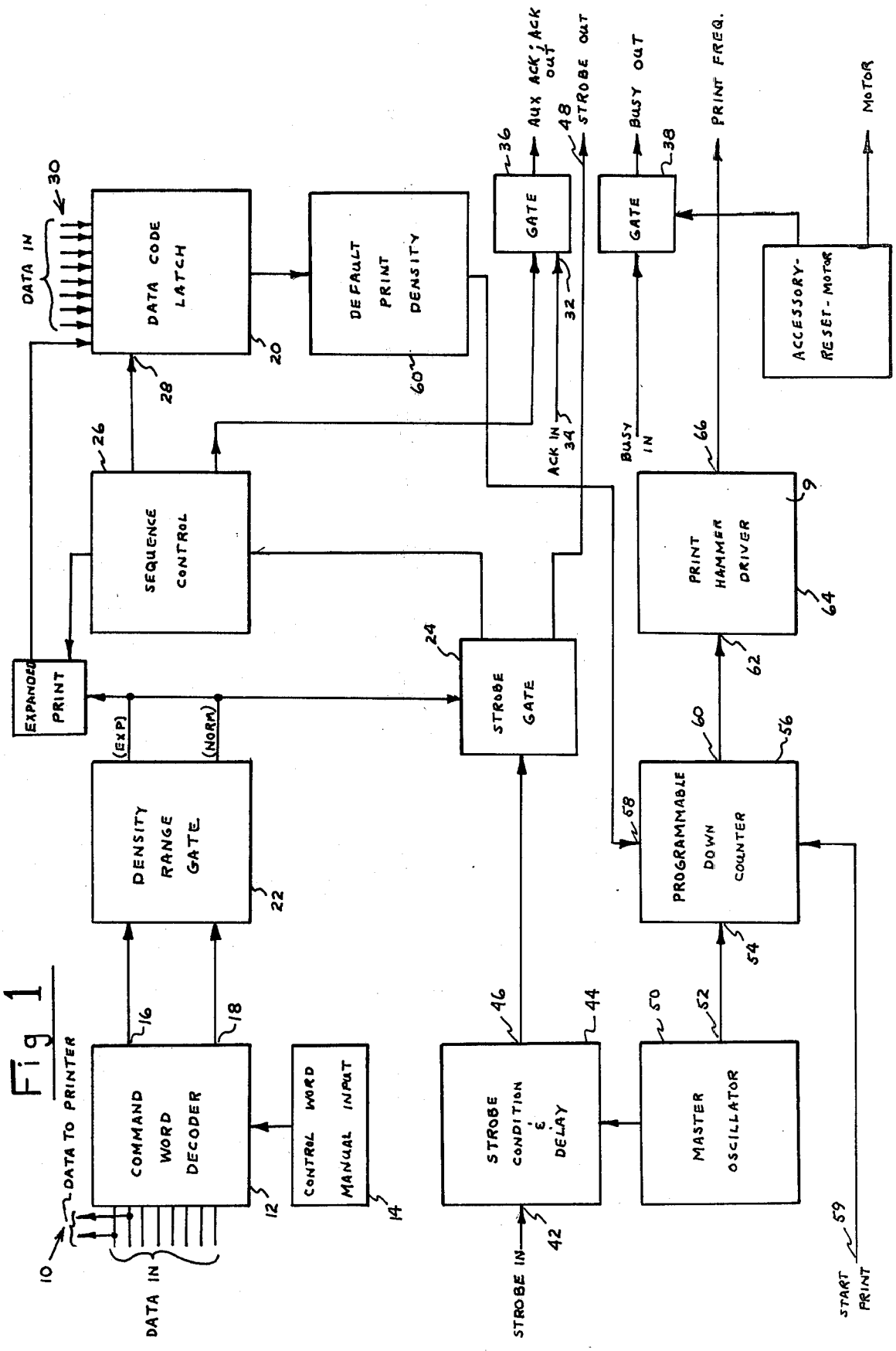

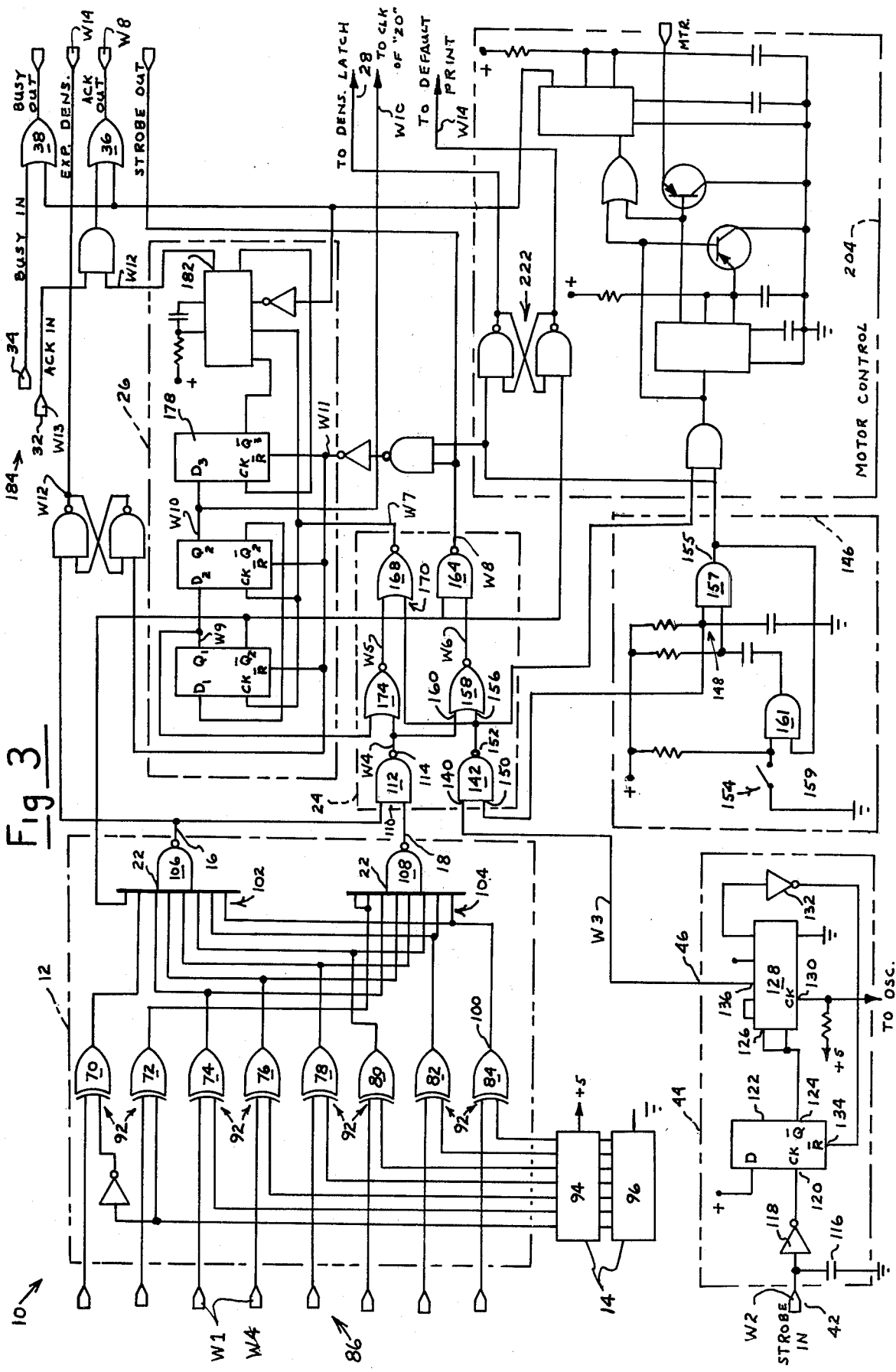

CONTROL CIRCUIT FOR USE WITH A DOT MATRIX PRINTER

BACKGROUND OF THE INVENTION

1. Field of the Invention

The present invention relates to control circuits for dot matrix printers and more specifically to such a control circuit which automatically and selectively varies the horizontal size of alphanumeric characters produced by the printer.

2. Description of the Prior Art

Dot matrix printers have become widely accepted, particularly in view of the versatility and economy of this particular type of printing device. This type of printer produces alphanumeric characters wherein each character is comprised of predetermined ones of a plurality of dots arranged in a grid, typical grids having fields 5 by 7, 7 by 9, or 9 by 9 dots.

The dot matrix printer, as currently employed, has, however, been subject to the same limitation inherent in conventional impact printing devices. Specifically, dot matrix printers as presently applied produce alphanumeric characters of a specific predetermined size. Accordingly, such printing variations and controls as right margin justification without deterioration of character proportion and spacing remain unrealized, albeit desirable objectives.

SUMMARY OF THE INVENTION

The present invention is based upon a realization that because the alphanumeric characters produced by a dot matrix printer are comprised of a multiplicity of dots, wherein the horizontal spacing of the dots is a function of the horizontal velocity of the print head assembly and the frequency at which the print hammers operate, the horizontal dimension of the characters can be varied over a limited, yet substantial, range by increasing and/or decreasing the lateral spacing between the individual dots of the matrix. The horizontal spacing of the characters can be effected by varying the print hammer striking frequency as it travels horizontally across a print line. The frequency, in turn, is controlled by means responsive to a coded signal entered into a data stream generated by an external data source. This coded signal may be a selected constant when the size of the printed alphanumeric characters is to be a predetermined constant. This would be the case, for example, when printing increased size alphanumeric characters in headings, decreased character size for footnotes, and the like.

In the application to right margin justification, the coded signal would be a parameter computer from the number of characters to be printed on a particular line and the length of the line to produce characters whose size is altered such that the entire printed line fills the line fully from left to right margin.

It is therefore an object of the invention to provide a control circuit for varying the print density of a dot matrix printer.

Another object of the invention is to provide such a control circuit which operates in conjunction with existing dot matrix printers without significant modification thereto.

Yet another object of the invention is to provide such a control circuit which permits variation of the horizontal dimension of alphanumeric characters generated by such a printer.

Still another object of the invention is to provide such a printer control circuit which functions by altering the print hammer striking frequency as it moves laterally across a print line.

Another object of the invention is to provide a control circuit which is automatically operable in response to reception of coded signals generated by an external data source.

Still another object of the invention is to provide a control circuit for use with a dot matrix printer which enables the automatic variation of the dot matrix density to effect alteration of the size of alphanumeric characters generated thereby.

BRIEF DESCRIPTION OF THE DRAWINGS

The objects, features and advantages of the invention will be apparent from the following description of a specific embodiment of the invention, as illustrated in the accompanying drawings, wherein:

FIG. 1 is a block diagram of a control circuit in accordance with the present invention;

FIGS. 3 and 4 are electrical schematics of a control circuit in accordance with the present invention.

DESCRIPTION OF A SPECIFIC EMBODIMENT

Figure 2:
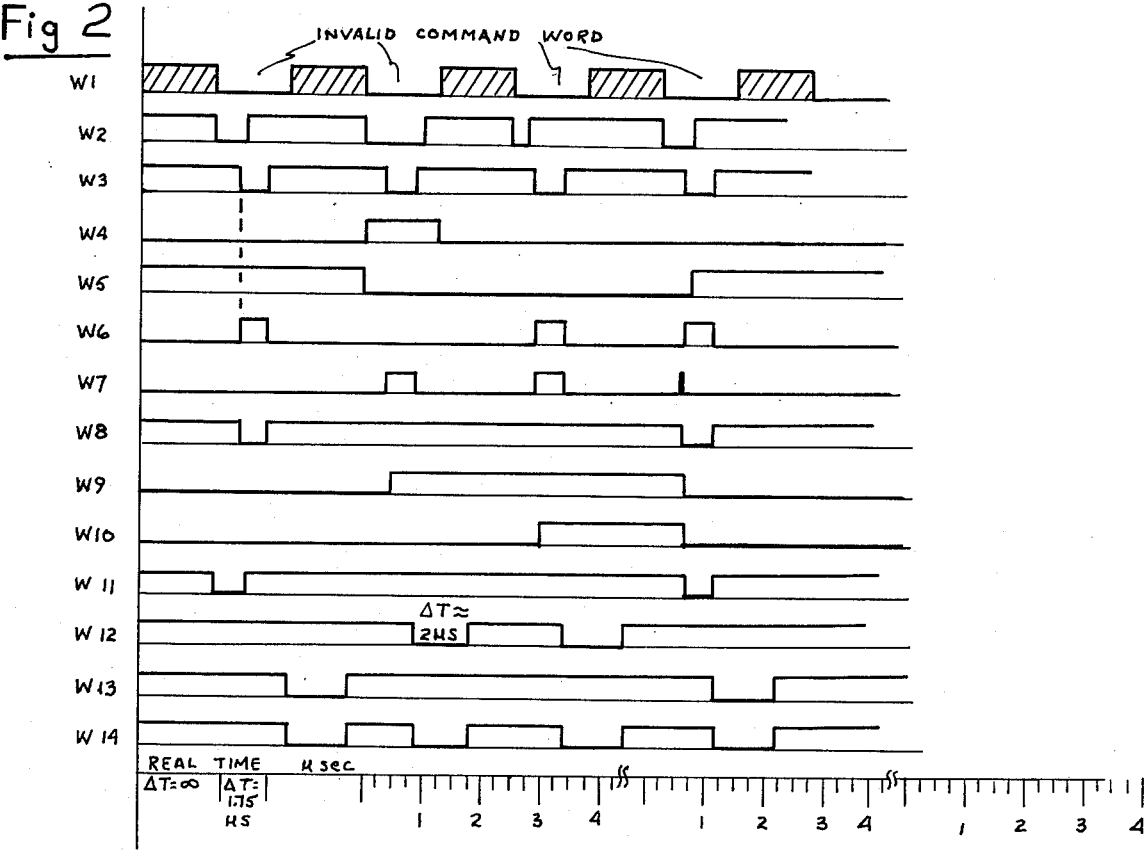
FIG. 2 is a timing chart useful in explaining operation of a control circuit in accordance with the present invention.

Referring to FIG. 1, a block diagram of a control 10 in accordance with the invention is shown. This control can be better understood with reference to the timing chart of FIG. 2 wherein various signals, referenced with a W prefix, are illustrated both in FIG. 2 and at the points of the control 10 where they occur. The control 10 includes a command word decoder 12 connected to receive and monitor data output signals from a data source (not shown) for the presence of a specific "command word" which is entered into the normal data stream. The data signals are typically generated simultaneously on a plurality of parallel data lines and conform to a predetermined binary code, such as an ASCII code, although any code, including serialized data, could be used.

The command word decoder 12 simultaneously receives an input signal from a control word manual input circuit 14, this signal being a predetermined selected value generated by manual switches and in the same binary code (or its complement, depending upon the type of logic to be employed) as the data signals generated by the external data source. The command word decoder continuously monitors the data output signals comparing same to the control signal generated by the control word manual input 14. Upon occurrence of the "command word" in the normal data stream, the command word decoder 12 generates an output signal at one of its output terminals 16 or 18. As will be explained in more detail below, one of the output terminals 16 or 18 is energized depending upon whether it is desired to ultimately print data in a "normal", variable dimension print size or an extra large or "expanded" character size, this information being determined by a particular one of the bits of the command word.

It will now be recognized that the command word decoder simply intercepts or otherwise monitors the data outputs from the external data source to determine the presence or absence of specific signals that correspond to the control word manual input signals. This signal is entered into the data train when it is desired to modify the size of the ultimately printed alphanumeric characters.

When an output signal has thus been generated at output terminal 16 or 18 in response to the occurrence of a command word, the control circuit 10 is conditioned to intercept the next data signal. This signal hereinafter referred to as a "density code signal", is entered into a density code latch 20. More specifically latch 20 responds to the output signal appearing at terminal 16 or 18, which, as will be explained in more detail below, is passed via a density range gate 22, a strobe signal gate 24, through a sequence control circuit 26 and into input terminal 28 of latch 20. This density code signal, which is entered via a plurality of parallel input lines 30, is held by the density code latch 20.

Simultaneously, upon reception of the command word, the standard "strobe", "acknowledge", and "busy" signals, which are signals generated by the data source and printer to establish communication therebetween are intercepted by the control 10. In a conventional circuit, the acknowledge signal is a response signal from the printer which advises the data source that the data output signals have been received. The busy signal is generated by the printer to advise the data source that it is in the process of printing the most recent data character string and is not yet ready to receive the next character data signal and the strobe signal establishes synchronization and triggering functions from the data source to the printer.

These signals, the acknowledge signal, the busy signal, and the strobe signal, are received in the circuit 10 at inputs 32, 34, and 42, respectively, of a pair of signal gates 36, 38, and a strobe conditioning and delay circuit 44, gates 36, 38, being controlled by the sequence control circuit 26 and sequence control circuit 26 being triggered by the occurrence of the command word and a strobe signal.

Circuit 44 performs the functions of generating a precise strobe signal having the desired strength, wave form, and delay required for proper operation of the printer. The conditioned strobe signal, which appears at terminal 46 of circuit 44, alternatively is passed from output terminal 48 to the printer for further utilization by the printer or is passed by means of gate 24 to the sequence control circuit 26.

The last major portion of the control 10 comprises a master crystal controlled oscillator which generates a precise predetermined clock signal at its output terminal 52. This signal is applied to the clock input terminal 54 of a programmable down counter 56. The programmable down counter has a plurality of parallel input terminals indicated generally at 58, which are connected through a default print density circuit 60 to the data code latch 20. The programmable down counter 56 has an output terminal 60 connected to the input 62 of an output frequency or print hammer driver circuit 64, the latter in turn having an output 66 connected to the print hammer drive circuitry in the dot matrix printer (not shown).

In operation, upon the receipt of a command word the control 10 is activated by the command word decoder generating either a normal or expanded density control signal to initialize the sequence control 26 and conditioning the density code latch 20 to receive the next coded input via its terminals 30. The next occurring signal from the data source is the specified character size "density code signal" which is entered into the density code latch and held. The output from the density code latch is applied through a default print density circuit 60 to the inputs 58 of the programmable down counter 56. Simultaneously, the strobe input signal is intercepted, conditioned, delayed and diverted to the sequence control 26 since the normal acknowledge signal generated by the printer does not occur due to interception of the strobe signal.

Simultaneously, a master oscillator 50, continuously operable whenever the control 10 is on, generates clock pulses which are applied to the clock input terminal 54 of a programmable down counter 56. The density code signal from density code latch 20 is applied to the parallel input terminals of programmable down counter 56. Upon the occurrence of an appropriate "start print frequency" signal on input terminal 59, the density code signal is "entered" into counter 56 and the clock pulses from oscillator 50 are used to sequentially decrement the programmable down counter 56, subtracting from the density code signal entered thereinto until the programmable down counter has been "zeroed". When this occurs, the output at terminal 60 changes state, this transition being sensed by the print hammer control circuitry through the driver circuit 64.

It will now be seen that the frequency at which the print hammers operate is a direct result of the signals applied to the terminals 58 of the programmable down counter, these signals in turn being controlled by the density code signal passed to the control circuit from the external data source. By appropriately selecting or varying the value of the second word of the data input signal, the density code signal, an appropriate coded signal is generated, applied to the programmable down counter and utilized to generate a variable frequency signal for the print hammers. Since the lateral or horizontal velocity of the print head along a print line is a constant, variation of the frequency at which the print head is activated will result in a decrease or an increase in the horizontal width of the characters produced in relationship to the value of the signals entered into the programmable down counter 56.

Figure 4:
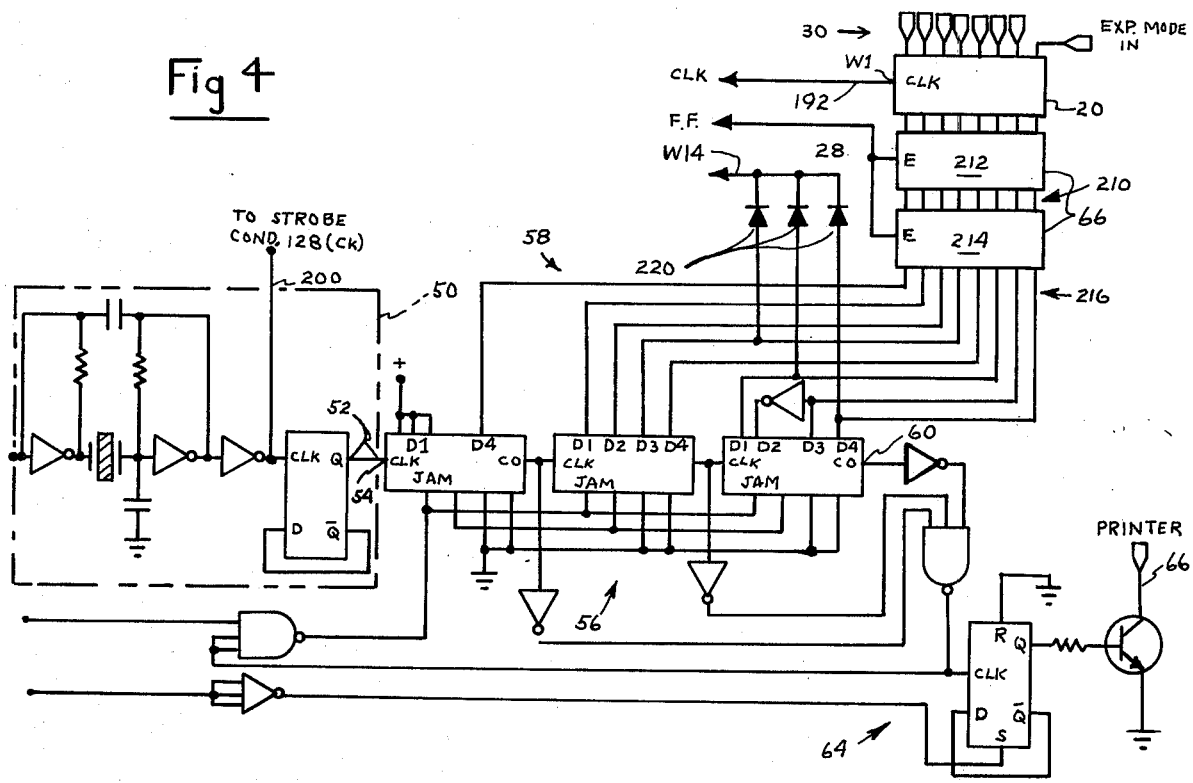

Referring now to FIGS. 3 and 4, there is shown a detailed logic diagram of a control 10 in accordance with the present invention. The command word decoder enclosed in dashed box 12 is comprised of a plurality of exclusive OR gates 70, 72, 74, 76, 78, 80, 82, and 84. Each of the gates 70–84 has one input terminal connected to a predetermined one of a plurality of data output lines 86. Each of the data lines 86, is in turn, connected via connector pins 88 to one of the data output lines of an external source of data (not shown). In the illustrated embodiment, the input data is assumed to be in ASCII code. The remaining input terminal 92 of each of gates 70–84 is connected to a predetermined one of a plurality of pull-up resistors, shown as box 94, one of the groups of a plurality of single throw switches, the input terminals 92 being connected to the resistors and switches to ground in response to closure of individual ones of the switches 96.

It should be observed that gates 70, 72, both have their input terminals 92 connected to the same one of the switches 96, but with gate 70 having its terminal 92 connected thereto through an inverter 98. Accordingly, the logic input signals to input terminal 92 of gates 70, 72, are always opposite. Thus configured, each of the gates 70–84 will generate a logical "one" output at the respective output terminals 100, upon the simultaneous occurrence of a logic "one" signal on the respective one of data lines 86 and a closed switch 96. The gate array consisting of gates 70–84 will thus produce an output signal simultaneously when the input data appearing on data lines 86 is the complement to the logic signal generated by switches 96, with the exception that gates 70,72, will always respond to inputs of opposite logic states, such that command word decoder 12 actually responds to either of two command words in the data stream, these two words differing only in one bit (typically, the "zero" bit). The outputs from gates 70–84 are applied in parallel to one of the groups of input terminals 102 and 104 of a pair of NAND gates 106, 108, respectively, except that the output from gate 70 is applied to one of the input terminals 102 of gate 106 only and the output of gate 72 is similarly applied to one of the inputs 104 of gate 108 only. The logical output of the command word decoder 12 will be a signal which appears at either terminal 16 or terminal 18, these signals occurring when the data received from the external data source (not shown) is the complement of the coded signal generated by the switches 96. The signal appears at terminal 16 or 18 occurs in accordance with whether the input data signal appearing on the data lines connected to the gates 70 or 72 agrees with the condition of the respective one of switches 96 or its complement.

In the event that the signals received on data lines 86 do not conform with the logic signal generated by switches 96, no output signal will appear at either terminal 16 or 18.

Terminals 16, 18, are connected to the inputs 110 of a NAND gate 112, which generates a logic "0" signal at its output terminal 114 if terminals 16 and 18 are at a high logic level. Simultaneously with the generation of data by the external data source, the data source is generating a strobe signal. This signal is received at input terminal 42 of the strobe conditioning and delay circuit in dashed box 44. The strobe conditioning and delay circuit includes an input filter comprised of capacitor 116 and inverter buffer 118, the output of which is connected to the clock input 120 of a "D" flip-flop 122, whose output 124 is connected to input terminals 126 of an eight-bit counter 128. Counter 128 has its clock terminal 130 connected to receive a 4 MHz clock pulse signal from a crystal controlled master oscillator 50. One output from counter 128 is connected through a buffer inverter 132 to reset input terminal 134 of flip-flop 122. The primary output of counter 128 appears at output terminal 136. It will now be realized that the output appearing at terminal 136 will be a clean, square wave pulse signal delayed in time by a factor determined by the clock signal frequency applied to terminal 130. In the present embodiment, this delay period is 0.75 microseconds, this delayed and conditioned pulse or strobe signal being applied to input terminal 140 of NAND gate 142. Assuming for the moment that the reset circuit in dashed box 146, a high resting active low circuit, is not activated (resting), a logic "1" signal will be applied from reset circuit output terminal 148 to input terminal 150 of gate 142. Correspondingly, when the strobe pulse appears at terminal 140, it will produce a negative strobe pulse at output terminal 152 of gate 142. If the reset circuit 146 is operated (by manual depression of switch 154), a low going pulse is applied from output terminal 155 of gate 157 to input 159 of gate 161. This in turn effects: operation of gates 222 to set a "preset density code" at output terminals 216 of pull-up resistors 214 (FIG. 4), by tri-stating tri-state gates 212, through diodes 220; application of a reset signal to the flip-flops of circuit 26; and production of an acknowledge pulse at terminal 182 to avoid a "hangup" of the data source.

Assuming that the circuit 10 is in normal operation, the strobe pulse appearing at terminal 152 of gate 142 is next applied to one input terminal 156 of NOR gate 158, the other input 160 of gate 158 being connected to receive the signal from output terminal 114 of gate 112. The simultaneous occurrence of signals from gate 112 and 142 results in blocking the strobe pulse to the printer. It will thus be seen that when an appropriate command word has been detected by the command word decoder circuit 12, the strobe pulse, which would ordinarily pass via gate 164 to the strobe output terminal 166, is blocked. Simultaneously, these same conditions will cause the strobe pulse to be passed via NOR gate 168, which is conditioned by input signals applied to its input terminals 170 received from gate 112 or an output from the sequence control circuit shown in dashed box 26, to be routed to the sequence and control circuit 26. The internal function of the sequence control circuit 26 can best be understood by reference to the following truth table wherein the logic values at specified terminals correspond to the similarly identified terminals appearing at dashed box 26 in FIG. 2:

| $Q_1$ | $\overline{Q_1}$ | $Q_2$ | $\overline{Q_2}$ | $D_1$ | $D_2$ |
|---|---|---|---|---|---|
| 0 | 1 | 0 | 1 | 1 | 0 |
| 1 | 0 | 0 | 1 | 1 | 0 |
| 1 | 0 | 1 | 0 | 1 | 1 |

The cumulative operation of the gates 158, 164, 168, and gate 174, coupled with circuit 26, is to block the passage of the first two strobe pulses (the second strobe pulse being blocked by gate 164 in response to the $\overline{Q_1}$ signal from sequence control 26) received at terminal 42 when the proper command word has been received via circuit 12. These first two strobe pulses occur in synchronism with the first two data word outputs received at terminals 86, these two words being the command word and the density code signal which correspond to an instruction that the horizontal width of an alphanumeric character is to be modified and a coded signal which establishes the actual size of the alphanumeric character, respectively.

Flip-flop 178, which is operatively coupled as a part of circuit 26 is provided for miscellaneous timing and race prevention purposes. A monostable multivibrator circuit 180 is coupled through flip-flop 178 to circuit 26, this flip-flop being triggered via the re-routed and delayed strobe pulse, monostable multivibrator 180 generating an auxiliary acknowledge pulse which appears at output terminal 182. This auxiliary acknowledge pulse is necessary and would not otherwise be generated by the printer by reason of strobe pulses being blocked.

Referring once again to the truth table above, it will be seen that a clocking signal corresponding to the second strobe pulse appears at output $Q_2$ of circuit 26, this signal being applied to the clock input terminal 192 of the data code latch 20 (FIG. 4), the latter comprising a plurality of "D" flip-flops which are individually connected to the data input terminals 30 (86). This causes the value of the next occurring data signal following the command signal, the density code signal, to be "latched" into the data code latch 20. Further data signals received on input terminal 86 are passed normally to the printer buffer with gate 164 now passing the strobe pulses on to the printer circuitry.

This latter function is effected by transfer of the density code latched into circuit 20 via parallel signal lines 58 to the input terminals of programmable down counter 56. Programmable down counter 56 is comprised of three four-bit programmable down counters which are interconnected to correspond to a seven-bit ASCII code with one additional bit which is utilized for the expanded or normal mode multiplier. Programmable down counter 56 has its input clock terminal 54 connected to receive a 2 MHz clock signal from the master oscillator clock output terminal 52. Master oscillator 50 itself is a conventional crystal controlled clock pulse generator which has an auxiliary 4 MHz clock signal output terminal 200 utilized by the strobe conditioning delay circuit 44, described above. The circuit is otherwise conventional.

Next in the operating sequence, the data signals from the external data source (not shown) are passed to the printer data input buffer (also not shown). When the input buffer is filled and a carriage return signal is transmitted by the printer, the print head assembly begins to move across the page. The data that will be reproduced by the head is a result of a plurality of print operations which occur in timed sequence. In a normal dot matrix printer, the lateral velocity of the print head is a constant and the frequency at which the print head operates determines the horizontal width of the alphanumeric character. This print frequency is, in turn, normally controlled by a fixed frequency clock signal generated by a fixed frequency clock within the printer. In the present invention, however, this fixed frequency clock (not shown) is eliminated and the signal generated thereby is replaced by the clock pulse signal outputted by the programmable down counter. It will now be recognized that the frequency of the clock signals outputted by the programmable down counter and appearing at the output terminal 60 are a direct function of the frequency of the master oscillator 50 and the value of the second data word which was inputted into the programmable down counter via signal lines 58. This precise variable frequency thus, in effect, determines the horizontal width of the character that is reproduced by the dot matrix printer head with this horizontal dimension being either increased or decreased in direct proportion to the frequency of the signal outputted by the programmable down counter 56. By incorporation of the additional stage of the programmable down counter, this frequency can be reduced substantially such that the output frequency will vary between two contiguous ranges, depending upon whether the alphanumeric characters are to be reproduced in a normal or "expanded" mode.

The control includes an auxiliary motor control circuit indicated generally at 204. This circuit replaces the standard motor control circuit contained in the printer and produces a synchronized motor "busy" signal which communicates with the data source to synchronize occurrence of data and operation of the motor. The circuit further functions to "shut down" the motor when data has not occurred for a predetermined period of time, such as, for example, 15 seconds. The circuit is also operatively coupled to the reset circuit and is coupled to receive the delayed and conditioned strobe pulse to reactivate the motor either upon actuation of the reset button 154 or the occurrence of a strobe pulse.

Lastly, the density code latch has connected to its output terminals a default print density circuit 210. This circuit comprises a plurality of tri-state gates 212 connected in parallel to the output terminals of latch 20 and a plurality of pull-up resistors 214 connected to the output terminals of the tri-state gates 212. Predetermined ones of the outputs 216 of resistors 214 are connected via diodes 220 to be responsive to the state of flip-flop circuit 222. Flip-flop 222, in turn, is responsive to the strobe and command word inputs. In the event that a density signal has not been received, circuits 212, 214, generate an auxiliary "default" print density signal which is entered into the programmable down counter to provide a predetermined horizontal dimensioned character since no such print size character code was actually received at the data input terminals 86, and some value is required for proper operation of the printer.

It will be observed that the circuit, when it is not desired to vary the density or horizontal dimensions of the alphanumeric characters of a line generated by the printer, will simply hold the value of the last data code signal. Simply by avoiding the injection of a command word in the data output stream received on the external data source, the size of the alphanumeric characters will remain constant. It has, however, been found desirable to allow the strobe conditioning and delay circuit to operate even under these circumstances, the strobe pulse occurring at its normal time but being more accurately controlled as to pulse shape, pulse width, and the like, required for operation of the printer. The master oscillator, because of its precise output frequency, is also continuously utilized, both with density code signal or default density codes signal to generate the print density which may, of course, conform with the standard print density of the dot matrix printer.

In the above description, the control 10 of the present invention has been embodied to effect control of the horizontal dimension of alphanumeric characters by controlling the striking frequency of the print hammers as the print head itself moves laterally along a print line at a constant velocity. It will now, however, be apparent to those skilled in the art that substantially the same result can be effected utilizing the teaching of the present invention to control the lateral velocity of the print head while maintaining the print hammer frequency a constant. More specifically, the control 10 of the present invention provides all of the circuitry required to produce a precise, variable frequency signal based upon a command word and a data code word received from any conventional data source and the frequency of which is directly related to the size of the alphanumeric characters to be generated on a particular print line. Utilizing this same variable frequency in conjunction with a variety of driver circuitry, precise speed control of the motor that drives the print head can be effected. For example, the variable frequency signal can be utilized to adjust the power supply frequency for driving a synchronous-type motor, can be used substantially directly in digital format to effect speed control of a stepping motor, or can be utilized as a digital set point reference for a circle drive motor. In each of thes embodiments, the required interfacing between the control 10 of the present invention and the print head drive are well within the capabilities of persons skilled in the art.

Accordingly, it will now be seen that the control 10 of the present invention provides a unique means for varying the horizontal dimensions of alphanumeric characters produced by a dot matrix printer. The control 10 can be incorporated in existing data source printer systems without any modification to the data source and, in many instances, without significant modification to the printer.

Applications for the present invention are diverse and include such uses as generating enlarged or contracted alphanumeric characters for use as captions, headings, footnotes, and the like, precise right margin justification with virtually imperceptible changes in character size and without deterioration of the spacing and/or proportions of the characters, and the like. This latter application can be particularly desirable in the field of test preparation in which printed pages can be "dressed" with great precision and without otherwise affecting the proportion or proportional spacing of the characters. This application of the present invention will be further enhanced as the quality of characters generated by dot matrix printers is improved by such means as increasing the density of the dots in the dot grid, incorporation of variable format lettering, and the like.

Further, in the above description, the control 10 has been described as operating with a data source that generates parallel data. It will, nonetheless, be obvious to those skilled in the art that the present invention is also applicable to systems wherein the data stream is serialized. For example, there exist numerous means for receiving serialized data and generating parallel coded data corresponding thereto and, conversely, for converting parallel data back into a serialized data format. Incorporation of such serial to parallel conversion into the present invention is, again, within the skill of those persons skilled in the art and, in view of the above description, modification of the control 10 of the present invention to operate with such systems would be obvious in view of the above disclosure.

While there have been described above the principles of this invention in connection with specific apparatus, it is to be clearly understood that this description is made only by way of example and not as a limitation to the scope of the invention.

What is claimed is:

1. A control circuit for use with a dot matrix printer and a data source which generates parallel binary coded data signals including a predetermined command word signal and density code signals comprising: A manual control word signal generating means for generating a parallel binary coded control word signal, gate means including a plurality of logic gates each having one input connected to said data source to receive a predetermined one of the bits of said parallel binary coded data signal and another input connected to said manual control word signal generating means to receive a predetermined one of the bits of said control word signals for generating a control circuit enabling signal in response to a logical correspondence of said command and said control word sigals, density latch gates means connected to said data source to receive density code signals and to said command word gate means for generating a density code output signal in response to said command word signal and said density code signals received from said data source, and a variable frequency printer signal generating means connected to receive said density code output signals for generating printer control signals having a frequency proportional to said density code signal, said printer being connected to said printer signal generating means to receive said printer control signals, the ratio of the printing frequency of the printing hammers and the lateral velocity of the printing head being proporational to changes in the frequency of said printer control signals, whereby the horizontal dimension each alpha-numeric character produced by said printer may be varied.

2. The control of claim 1 wherein said command word gate means and said density latch gate means are digital circuits, said command word and density code signals being binary signals.

3. The control of claim 2, further including a density range gate connected to said command word gate means for alternately generating a normal mode and an expanded mode enabling signal in response to the state of a predetermined one of the bits of said command word.

4. The control of claim 2 wherein said data source generates parallel binary coded data signals, said density code latch gate means being connected to receive individual bits of said parallel data signals for generating a density code count signal corresponding thereto.

5. The control of claim 2 wherein said printer control signal generating means is a digital circuit.

6. The control of claim 5 wherein said variable printer control signal generating means includes a programmable down counter having its input connected to receive said density code count signal, a clock signal generating means for generating a clock signal of predetermined frequency, said programmable down counter being connected to receive said clock signal, said printer control signal being a logical combination of said density code count signal and said clock signal.

7. The control of claim 2 wherein said printer includes a print head which traverses a print line at a constant velocity, said printer signals being print hammer control signals.

8. The control of claim 2 wherein said data source generates parallel binary coded data signals, said command word gate means including a plurality of logic gates, each said logic gate having one terminal thereof connected to receive a predetermined one of the binary bits of said parallel coded binary signal, and further including a manual control word signal generating means for generating a parallel binary coded signal, each of said logic gates having another input terminal thereof connected to receive a predetermined one of the bits of said manually generated control word, said command word gate means generating said control circuit enabling signal in response to logical correspondence of said command and control words.

9. The control of claim 4 wherein said data source generates parallel binary coded data signals, said density code latch gate means being connected to receive individual bits of said parallel data signals for generating a continuous density code count signal corresponding thereto.

10. The control of claim 6 wherein said variable frequency striking signal generating means includes a programmable down counter having its input connected to receive said density code count signal, and clock signal generating means for generating a clock signal of predetermined frequency, said programmable down counter being connected to receive said clock signal, said printer control signal being a logical combination of said density code count signal and said clock signal.

* * * * *